United States Patent Office 3,265,341
Patented August 9, 1966

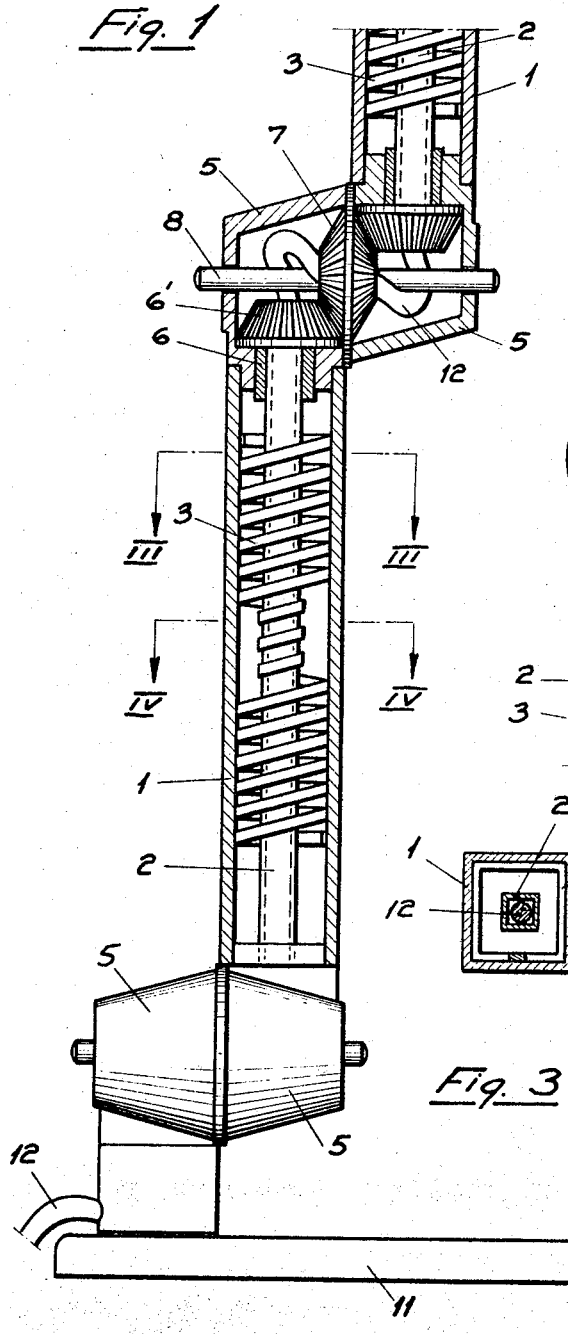
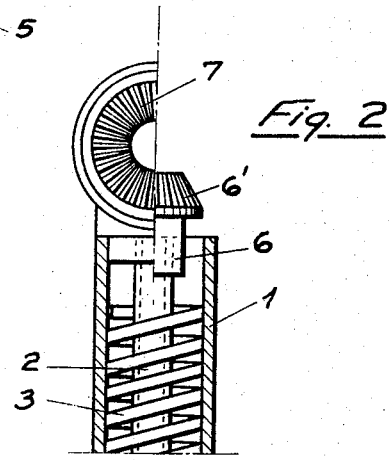
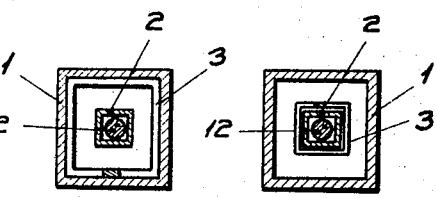

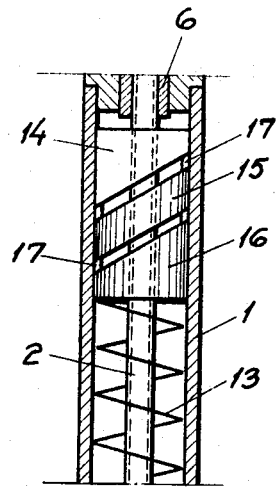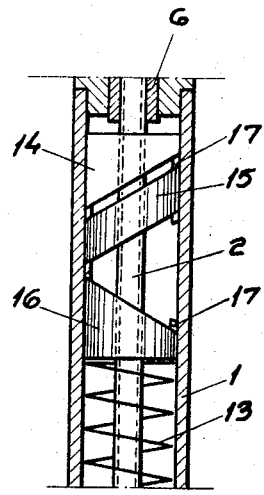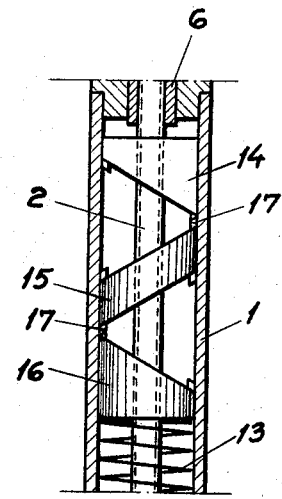

3,265,341
STANDS FOR ELECTRIC-LIGHT FITTINGS AND THE LIKE
Nils T. A. Rüder, Erik Dahlbergsgatan 11, Malmö, Sweden
Filed June 15, 1964, Ser. No. 375,124
Claims priority, application Sweden, June 24, 1963, 6,935/63
5 Claims. (Cl. 248—123)

The present invention refers to improvements in stands for electric light fittings and the like, of the type which can be set in any desired position, the stands comprising an arm composed of a plurality of sections connected by adjustable joints. Prior stands of this kind may allow a fairly varied adjustment of the lighting source mounted in the stand but still do not always render possible such a wide variation as would sometimes be desirable.

It is an object of the invention to provide a device by which it may be attained that the electric light fitting or the like has imparted to it a parallel motion only, when the position of the stand is changed, while the fitting, on the other hand, can be set in any direction independent of the position occupied for the moment by the stand.

It is a further object of the invention to provide a device of this kind in which the cable required for the power supply to an electric light fitting is completely enclosed within the stand in such a way that, first, it is not exposed to damage from the outside and, second, it is not subjected to any appreciable wear at the points where the cable passes the various joints of the adjustable arm.

It is another object of the invention to provide a device of the said kind in which the parts thereof are extremely easy to assembly, whereby the manufacturing costs can be reduced quite considerably.

The device according to the invention is characterized by the fact that each of said sections of the arm consists of an outer tube element having joint cup members disposed at each end and turned 180° away from each other, an inner tube element of polygonal cross section and guide sleeves mounted on each end of the inner tube element and received in the respective joint cup member, said guide sleeves having a polygonal cross section similar to that of said inner tube element and being provided with a bevel gear ring, and balance spring means enclosed within the outer tube element but surrounding the inner tube element, said balance spring means being adapted, at an angular movement of the tube elements in relation to each other, to produce a force tending to return the tube elements to their original position, and further characterized by the fact that the joint cup members forming each of the joints between the sections enclose between them a bevel pinion which is common to both sections and is in engagement with the bevel gear rings of both of the adjacent guide sleeves for connecting the sections with one another, said joint cup members being held together, by means of an axle passing through the joint cup members themselves and through the bevel pinion, under a compressive force such that an amount of friction functioning to maintain the sections in their mutual position as once occupied is produced in the joint. The stand may be secured to a base plate in such a way that it may be rotated through 360°. When using the stand for supporting an electric light fitting an electric cable may be drawn through the inner tube element in such a way that it is completely encased in the various sections of the stand.

The invention will be described more closely in the following with reference to the accompanying drawings, in which FIG. 1 illustrates in longitudinal section part of the arm according to the invention and its joint means in one embodiment; FIG. 2 shows a joint cup member with pinion and gear rings mounted therein; FIG. 3 is a transverse section along the line III—III in FIG. 1, and FIG. 4 is a transverse section along the line IV—IV in FIG. 1; FIG. 5 illustrates in longitudinal section part of the arm in a modified embodiment; and FIGS. 6 and 7 illustrate in longitudinal section the same part of the arm with its elements in other angular positions in relation to each other.

Referring to FIGS. 1 to 4 in the drawings, each section of the arm comprises a square tube element 1 which is terminated at its ends by joint cup members 5 which are turned 180° away from each other. In the tube element 1 is inserted a spring 3, and in this spring is inserted a similarly square inner tube 2 of similar cross section. The spring 3 is of a helical type and has its extreme end turns of square cross section and fitting to the inner side of the tube element 1. Furthermore, the spring has two or three turns midway of its length also made square but of smaller cross section, in which the tube 2 has a close fit and therefore is prevented from rotating otherwise than together with the spring.

The joint cup members 5 are open on one side and have an opening in the wall forming the other side for the passage of a tight fitting or threaded spindle 8 by which the joint cup members are adapted to be locked together with their open sides turned towards each other.

In each joint cup member 5 is rotatably mounted a guide sleeve 6 of square inner cross section in which the square tube element 2 is adapted to engage. The guide sleeve is provided with a bevel gear ring 6' in engagement with a pinion 7 which is seated with its rim portion between the two joint cup members facing each other and is clamped together with the latter by means of the spindle 8. As will be understood, this pinion is common to the gear rings 6' on the guide sleeves in both joint cup members.

Since the spindle 8, having a reverse thread at one end, can be tightened to the desired degree of tension, the amount of friction is created at the contact surfaces of the joint cup members which is required to attain that the various parts of the lamp arm will remain in the position to which they have been set.

When adjusting one or more of the arm sections of the stand at a certain angle in relation to the adjacent section, a torque is exerted on the bevel gear ring 6' owing to its engagement with the pinion 7, whereby the tube 2 inserted in the guide sleeve 6 is rotated an amount corresponding to the travel of the gear ring on the pinion. The arm section is rotated by exerting a force sufficient to overcome the friction clamping force holding the pinion 7. This rotation is transmitted to the guide sleeve, with its bevel gear ring 6', at the other end of the tube 2, said bevel gear ring moving a corresponding length on the pinion with which it is in engagement. By the rotation of the tube 2 the spring 3 is tensioned in the tube element 1, the angular position of which is changed, and this spring force tends to return the element to the original position but is prevented therefrom by the friction present between the surfaces where the joint cup members engage the pinion 7. If the upper arm section is rotated, the bevel gear 6' of the lower arm section may rotate so as to tension the spring 3 in the lower arm section. By rotating the tube 2 an amount corresponding to the movement of the gear ring 6' on the pinion 7 the cable 12 located within the tube 2 will be rotated correspondingly and consequently is not subjected to abnormally high stresses.

A tubular element, shown interposed between the base 11 and the lowermost cup member 5, may be secured at its upper end to the lowermost cup member 5, as in the manner employed to connect the lower tube member 1 to the upper cup member 5; and at its lower end, may be journaled to the base plate 11 to enable rotation of the stand upon the said base plate 11. An electric cable 12 is shown introduced at the left-hand wall of the said tubular element. This cable is drawn through the inner tube 2 and then through the centre opening in the pinion 7, the cable being laid substantially in parallel with the locking spindle 8. In the drawing the cable is illustrated, for the sake of clarity, as laid in exaggerated bights. Such mounting is unnecessary in itself, since the cable is not subjected to longitudinal tension stresses in adjusting the lamp arm to different positions. As a result it is achieved that there will be no wear on the cable.

FIGS. 5–7 illustrate the arm described above as modified by substituting a different kind of balance spring means for the spring 3. In each section of the arm said means consists of a helical spring 13 which is inserted in the tube element 1 and is supported by one of its ends against a fixed abutment in this element, and of three sleeves 14, 15 and 16 which are axially aligned in a row within the outer tube element 1 and are adapted at a rotation of the inner tube element 2 in relation to the outer one to cause a compression of the spring 13 or allow recoiling thereof. The uppermost sleeve 14 has the same square cross section on the outside as the tube element 1 and is thus non-rotatable in relation to the tube element, and it is besides locked also against sliding movement in the tube element by appropriate means. In its interior the sleeve has a circular cross section of such dimension that the inner tube element can pass freely therethrough. The lower end of the sleeve 14 is beveled at an angle $a$ of e.g. 45° to the sleeve axis. The intermediate sleeve 15 has a circular cross section both on the outside and on the inside of such dimensions that it fits within the square tube element 1 and on the outside of the inner tube element 2, but it is not fixed in axial relation to any of the tube elements 1 and 2. The sleeve 15 has both ends beveled, at least the upper end enclosing the same angle $\alpha$ with the sleeve axis as the lower end of the sleeve 14. The lowermost sleeve 16 has a circular cross section on the outside of a diameter equal to the side length of the outer square tube element 1 and the same square cross section on the inside as the outside section of the inner tube element. Accordingly, the sleeve 16 is rotatable in relation to the tube element 1 but non-rotatable in relation to the tube element 2. Furthermore, it is slidable in relation to both tube elements 1 and 2. The upper end of the sleeve 16 is beveled at the same angle $\beta$ to the sleeve axis as the lower end of the sleeve 15, the angle $\beta$ possibly but not necessarily being equal to $\alpha$. In the position according to FIG. 5 the total length of the sleeves 14, 15 and 16 is a minimum and the length of the spring 13 a maximum. In FIG. 6 the inner tube element 2 and with it the lowermost sleeve 16 has been rotated through 180°, which has caused a corresponding compression of the spring 13, and in FIG. 7 the tube element 1 and the sleeve 14 have been rotated, from a relative point of view, through 180° in the opposite direction while further compressing the spring. By the spring pressure a force is produced which tends to return the tube elements to their original positions, but this force is opposed by the friction at the surfaces where the joint cup members 5 of the arm engage the pinion 7. The sleeves 14, 15 and 16 are provided with stops 17 on the surfaces thereof which are turned towards each other to limit the rotation of each sleeve to 180° in relation to the nearest one of the remaining sleeves.

By means of the device according to the invention a lighting source can be set in an infinitely variable number of positions without subjecting the cables appertaining to the electric light fitting to abnormally high tensile or torsional stresses which might cause breakage or wear.

Modifications of the device described are conceivable within the scope of the present invention. For example, while the inner tube element 2 and the guide sleeve 6 have been described as square in cross section, it is apparent that other polygonal cross sections of said members are equivalent thereto in their function and may be substituted for said square cross section.

What I claim is:

1. A stand for electric light fittings and the like that comprises, in combination, at least two tubular arm sections each provided with a corresponding inner coaxial tubular element mounted therewithin, the arm sections and corresponding tubular elements being relatively rotatable, balance spring means mounted about each inner tubular element and rotationally secured thereto at one portion thereof, the balance spring means being rotationally secured at another portion thereof to the corresponding tubular arm section, pivot means disposed between the two arm sections to connect the said two arm sections to form an articulated arm, and to transform pivotal movement of the said arms to relative rotational movement between the said arm sections and corresponding tubular elements against a restraining force provided by the balance spring means.

2. A stand for electric light fittings and the like that comprises, in combination, at least two tubular arm sections, pivot means disposed between the two sections and adapted to connect the said two sections to form an articulated arm, an inner tubular element corresponding to and mounted within each of the said tubular arm sections, balance spring means disposed about each of the inner tubular elements and rotatably secured at one portion thereof to the corresponding inner tubular element, the spring means being rotatably secured at another portion thereof to the corresponding tubular arm section, the pivot means comprising joint cup members in face-to-face relationship, spindle means within the joint cup members to form an axis about which the tubular arm may be made to pivot, bevel pinion means disposed upon said spindle means, bevel gear ring means secured to adjacent ends of the inner tubular members and disposed within the joint cup members to engage the bevel gear for transforming pivotal movement of the tubular arm sections about said axis to relative rotational movement between the inner tubular members and the corresponding tubular arms, the spring means thereby being distorted and tending to restore the said arms to their position prior to rotational movement.

3. A stand as claimed in claim 2 and in which both the said tubular arm sections and inner tubular elements are polygonal in cross section and in which the balance spring means comprises helical springs of polygonal cross section correspondingly to fit within the said tubular arm sections and about the said inner tubular elements.

4. A stand as claimed in claim 2 embodying a plurality of successively connected tubular arm sections and corresponding inner tubular elements all rotationally mounted upon a common base.

5. A stand as claimed in claim 2 and in which the said inner tubular sections are each provided with guide means which are received in corresponding joint cup members.

References Cited by the Examiner

UNITED STATES PATENTS

| | | | |
|---|---|---|---|
| 1,708,047 | 4/1929 | Bosworth | 248—292 |
| 2,116,050 | 5/1938 | Stock et al. | 285—1 |
| 2,434,986 | 1/1948 | Bremer | 248—122 |
| 2,608,367 | 8/1952 | Boltuch | 248—123 |
| 3,030,128 | 4/1962 | Versen | 285—185 |

CLAUDE A. LE ROY, *Primary Examiner.*

FRANK L. ABBOTT, CHANCELLOR E. HARRIS,
*Examiners.*

R. P. SEITTER, *Assistant Examiner.*